(12) United States Patent
Matsumoto et al.

(10) Patent No.: US 12,273,003 B2
(45) Date of Patent: Apr. 8, 2025

(54) BREATHER DEVICE FOR MOTOR CASE

(71) Applicant: HONDA MOTOR CO., LTD., Tokyo (JP)

(72) Inventors: Takuya Matsumoto, Saitama (JP); Yoshitaka Ota, Saitama (JP); Atsushi Moroi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 18/322,793

(22) Filed: May 24, 2023

(65) Prior Publication Data

US 2024/0022133 A1 Jan. 18, 2024

(30) Foreign Application Priority Data

Jul. 18, 2022 (JP) ................................ 2022-114429

(51) Int. Cl.
*H02K 5/10* (2006.01)
*H02K 7/116* (2006.01)

(52) U.S. Cl.
CPC ............. *H02K 5/10* (2013.01); *H02K 7/1166* (2013.01); *H02K 2205/09* (2013.01)

(58) Field of Classification Search
None
See application file for complete search history.

(56) References Cited

U.S. PATENT DOCUMENTS 11,993,902 B2 * 5/2024 Matsumoto ............... E01H 5/04

FOREIGN PATENT DOCUMENTS

JP 2017115305 A * 6/2017
JP 2021095941 A * 6/2021

OTHER PUBLICATIONS

JP-2021095941-A, Hiyoshi, all pages (Year: 2021).*
JP-2017115305-A, Chiba, all pages (Year: 2017).*

* cited by examiner

*Primary Examiner* — Naishadh N Desai
(74) *Attorney, Agent, or Firm* — Armstrong Teasdale LLP

(57) ABSTRACT

A breather device comprises a substantially enclosed breather chamber (132) defined between a first end wall (102D) of a motor case and a second end wall (82B) of a gear case opposing each other, a motor communication hole (122) provided in the first end wall, an external communication passage (124) formed in the motor case or the gear case at a position lower than the motor communication hole so as to communicate the breather chamber to outside, and a partition wall (128) extending laterally across the breather chamber and projecting from one of the first end wall and the second wall toward the opposing end wall so as to define a small gap (130) between the partition wall and the opposing end wall, the partition wall being positioned between the motor communication hole and the external communication passage.

8 Claims, 8 Drawing Sheets

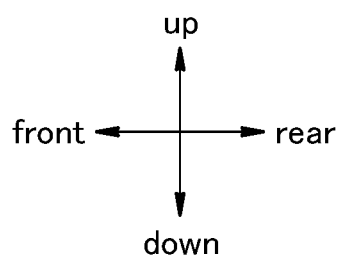
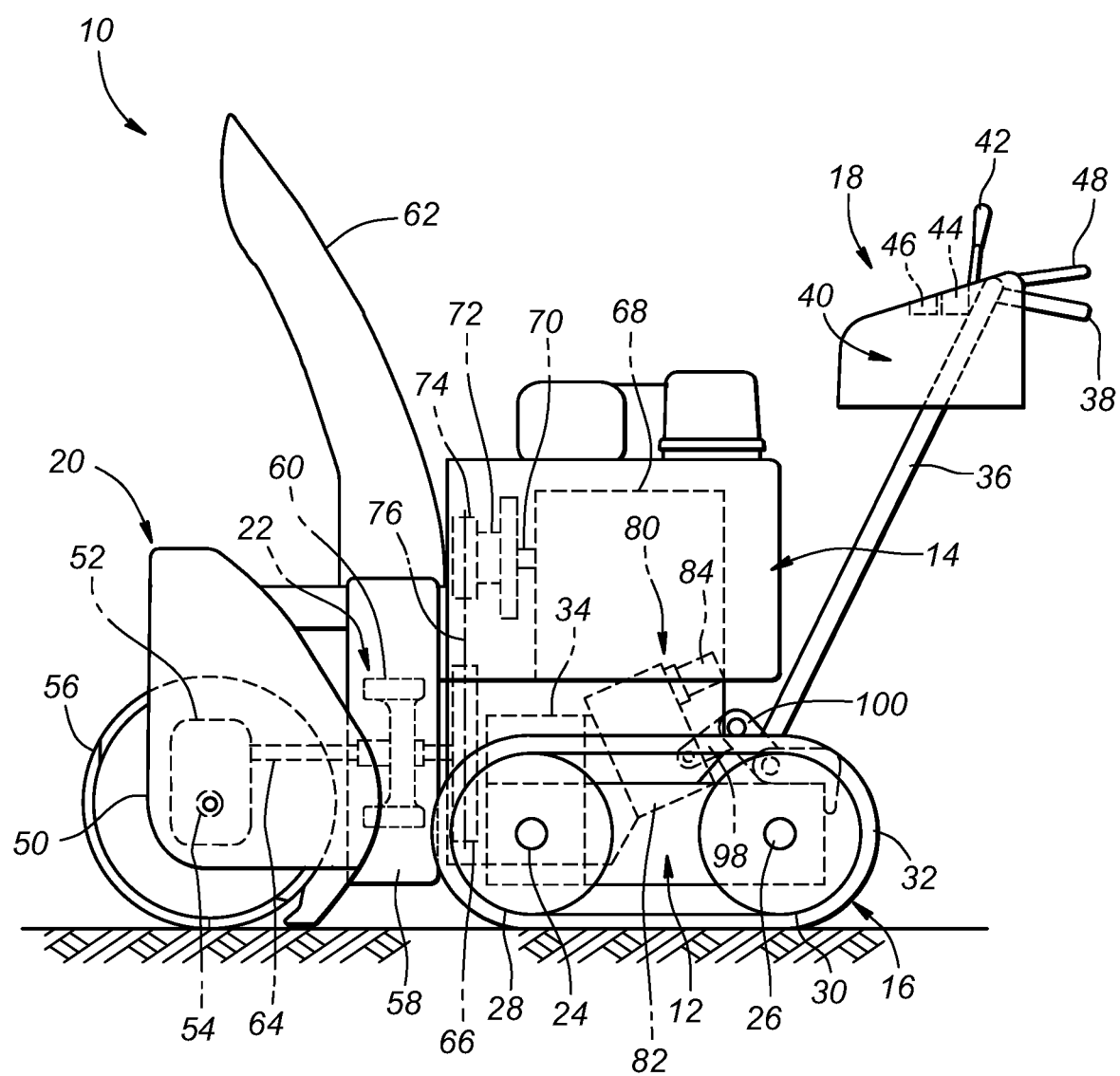
Fig.1

BREATHER DEVICE FOR MOTOR CASE

TECHNICAL FIELD

The present disclosure relates to a breather device for a motor case.

BACKGROUND ART

In recent years, efforts have been made to provide access to sustainable transport systems that take into account the most vulnerable transport participants. In order to achieve this goal, the inventors of this application have focused on research and development efforts to further improve the safety of traffic and the convenience of movement and life through research and development for snow throwers.

It is known in the field of snow throwers to allow the adjustment of the ground height of the auger by using an electric actuator. See JP2017-115305A, for instance. In such snow blowers, the electric motor that is used as a power source is required to be protected from the intrusion of foreign matters, in particular, water while being provided with an air breathing hole in the motor case to allow the interior of the motor case to be communicated with the outside.

JP2021-95941A discloses a drive unit including an electric motor and a planetary gear unit that are received in a case so as to be separated from each other by a partition wall through which the output shaft of the electric motor passes. The planetary gear unit includes a carrier attached to the partition wall, and the carrier is provided with a recess that defines a cavity in cooperation with the partition wall. This cavity forms a part of a circuitous passage way that communicates the interior of the case with the outside.

Since snow throwers typically operate in a wet environment, it is important for the electric motor for adjusting the ground height of the snow thrower to be protected from water while being provided with an air breathing hole in the motor case to allow the interior of the motor case to be communicated with the outside. Therefore, there is a need to provide a breather device for the electric motor.

SUMMARY OF THE INVENTION

In view of the background described above, a primary object of the present invention is to provide a breather device for an electric motor that allows external air to be introduced into and discharged from the interior of the motor while preventing intrusion of water into the electric motor via the breather device, and thereby to contribute to the development of sustainable transportation systems and comfortable life styles.

To achieve such an object, a certain aspect of the present invention provides a breather device for a motor case (102) of an electric motor (84), the motor case being connected to a gear case (82) that receives a gear train therein, wherein the motor case and the gear case are respectively provided with a first end wall (102D) and a second end wall (82B) that oppose each other, and an output shaft of the electric motor and an input shaft of the gear train are passed through the first end wall and the second end wall, respectively, and are connected to each other in a torque transmitting relationship, the breather device comprising: a breather chamber (132) defined between the first end wall (102D) and the second end wall (82B) in a substantially enclosed manner; a motor communication hole (122) provided in the first end wall so as to communicate an interior of the motor case with the breather chamber; an external communication passage (124) formed in a wall of the motor case or the gear case at a position lower than the motor communication hole so as to communicate the breather chamber to outside; and a partition wall (128) extending laterally across the breather chamber and projecting from one of the first end wall and the second wall toward the opposing end wall so as to define a small gap (130) between the partition wall and the opposing end wall, the partition wall being positioned between the motor communication hole and the external communication passage.

The combination of the external communication passage and the partition wall is effective in preventing water from reaching the interior of the motor case.

Preferably, in this breather device, the partition wall is provided below the output shaft of the electric motor.

Thereby, the water is prevented from reaching the interior of the motor case via a hole in the first partition wall through which the output shaft is passed.

Preferably, in this breather device, the partition wall slopes downward from both side parts thereof (128A) toward a central part thereof (128B).

Thereby, the water that has entered an upper part of the breather chamber is collected in the central part of the partition wall so that the water can be expelled in a predictable manner.

Preferably, in this breather device, the external communication passage has an inner end (124A) which is vertically aligned with the central part of the partition wall.

Thereby, the water that has entered the breather chamber is smoothly discharged from the external communication passage.

Preferably, in this breather device, the external communication passage has an inner end at a lowest point in the breather chamber.

Thereby, the water that has entered the breather chamber is smoothly discharged from the external communication passage.

Preferably, in this breather device, the external communication passage includes an inner section (124A) that extends from the breather chamber into the first end wall of the motor case in an axial direction, an intermediate section (124C) that extends tangentially from the inner section, and an outer section (124B) that extends downwards from an end of the intermediate section remote from the inner section to an exterior of the motor case.

Since the external communication passage is three dimensionally bent, and extends vertically in the outer section thereof, water is prevented from intruding into the interior of the motor case while permitting water that has entered the breather chamber to be readily expelled to the outside.

Preferably, in this breather device, the external communication passage has a larger passage cross-sectional area at an inner end thereof than at an outer end thereof.

Thereby, water that has entered the external communication passage can be easily discharged to the outside via the outer end of the external communication passage.

Preferably, in this breather device, the second end wall of the gear case is axially recessed from a peripheral wall of the gear case, and the first end wall of the motor case protrudes axially from a peripheral wall of the motor case, and is complementarily fitted into a part of the peripheral wall of the gear case extending proud of the second end wall.

Thereby, the output shaft of the electric motor and the input shaft of the gear train provided in the gear case can be easily and reliably aligned in a coaxial relationship, and the external communication passage having a complicated flow path shape can be defined in a favorable manner.

The present invention thus provides a breather device for an electric motor that allows external air to be introduced into and discharged from the interior of the motor while preventing intrusion of water into the electric motor via the breather device.

BRIEF DESCRIPTION OF THE DRAWING(S)

FIG. 1 is a side view of a snow blower provided with a breather device for an electric motor according to an embodiment of the present invention;

DESCRIPTION OF THE PREFERRED EMBODIMENT(S)

A preferred embodiment of the present invention as applied to a snow blower will be described in the following with reference to the appended drawings.

Figure 2:
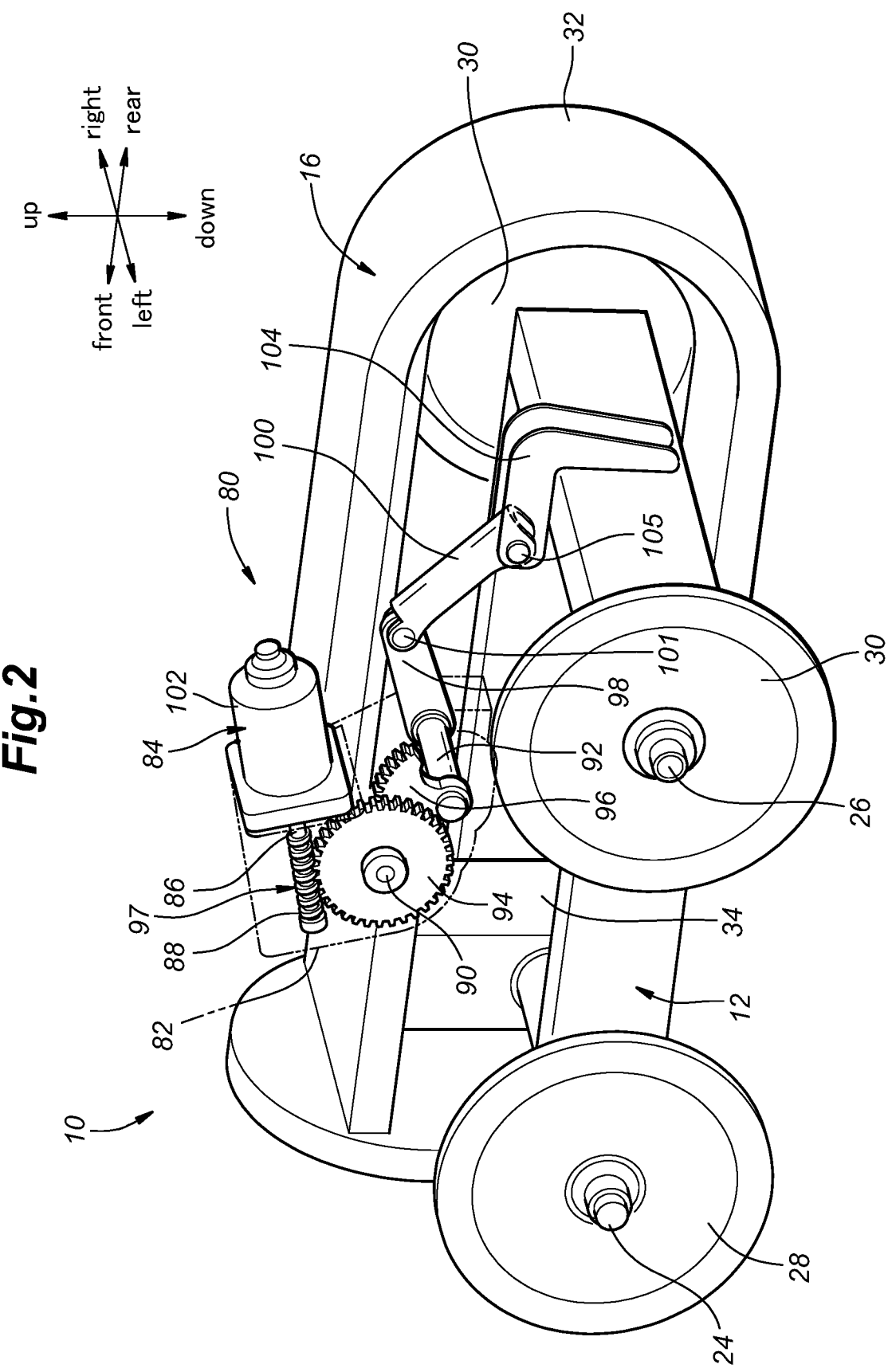
FIG. 2 is a perspective view of a mechanism for raising an upper body of the snow blower relative to a lower body of the snow blower.

FIGS. 1 and 2 show the overall structure of the snow blower 10 which in this case consists of a walk-behind snow blower 10.

The snow blower 10 is provided with a lower body (travel frame) 12 and an upper body (main body frame) 14 pivotally mounted to the lower body 12 as will be described hereinafter. The lower body 12 is fitted with a travel unit 16 and a steering unit 18. The upper body 14 is fitted with an auger device 20 and a blower device 22 for removing snow from the road surface.

The travel unit 16 includes a front shaft 24 extending laterally in a front part of the lower body 12 in a rotatable manner, a rear shaft 26 extending laterally in a rear part of the lower body 12 in a rotatable manner, a pair of driven wheels 28 fitted to either lateral end of the front shaft 24, a pair of idle wheels 30 fitted to either lateral end of the rear shaft 26, a pair of crawlers 32 each passed around the driven wheel 28 and the idle wheel 30 on the corresponding side, and a travel drive unit 34 that drives the driven wheels 28 via the front shaft 24. In FIG. 2, the crawler 32 on the left side is omitted from illustration.

The steering unit 18 is provided with a pair of arms 36 extending rearward and upward from either side of a rear part of the lower body 12, a pair of grips 38 provided at the rear (upper) ends of the arms 36, respectively, and an input unit 40 attached to the upper end parts of the arms 36. The grips 38 are configured to be gripped by the operator.

The input unit 40 is configured to receive input operations performed by the operator, and includes a travel lever 42 that receives a travel operation of the travel unit 16, a snow removal switch 44 that receives a snow removal operation of the auger device 20 and the blower device 22, a height adjustment switch 46 that accepts a height adjustment operation of the upper body 14, which will be described hereinafter, and a clutch lever 48 that accepts an operation of a deadman's clutch 72, which will be described hereinafter.

The auger device 20 includes an auger housing 50 attached to the upper body 14 via a blower case 58, which will be described hereinafter, a gear case 52 attached to the auger housing 50, an auger shaft 54 extending laterally through the gear case 52, and an auger 56 attached to the auger shaft 54. A drive shaft 64 serving as an input shaft of the gear case 52 extends rearward from the gear case 52.

The blower device 22 includes a blower case 58 attached to the upper body 14, a blower 60 supported by the drive shaft 64 so as to be rotatable in the blower case 58, and a discharge chute 62 attached to the top of the blower case 58.

An internal combustion engine 68 is mounted to an upper part of the upper body 14, and is provided with an output shaft 70 extending forward. A small-diameter drive pulley 74 is attached to the output shaft 70 via a deadman's clutch 72. A large diameter driven pulley 66 is attached to the rear end of the drive shaft 64 which extends into the upper body 14. An endless belt 76 is passed around the drive pulley 74 and the driven pulley 66.

Thus, the power of the internal combustion engine 68 is transmitted from the output shaft 70 to the drive shaft 64 via the pulley mechanism, and rotates the auger 56 via a gear mechanism (not shown) in the gear case 52 at the same time as rotating the blower 60 supported by the drive shaft 64.

As a result, the rotation of the output shaft 70 is transmitted to the drive shaft 64 via the deadman's clutch 72, the drive pulley 74, the endless belt 76 and the driven pulley 66 so that the auger 56 and the blower 60 are driven in synchronism.

As the snow blower 10 travels forward, the auger 56 crushes the snow in front of the snow blower 10, and gathers the crushed snow to a laterally central part of the auger housing 50. The blower 60 forces the collected snow upward through the discharge chute 62, and throws out the snow from the upper end of the discharge chute 62.

For a favorable snow removal operation, it is desirable that the elevation or the ground height of the auger 56 can be adjusted. In this embodiment, to accomplish this goal, the upper body 14 can be raised and lowered with respect to the lower body 12 by pivotally supporting the upper body 14 on the lower body 12 via a laterally extending shaft, in particular the front shaft 24. The upper body 14 is provided with a lift device 80 that provides the power required for raising the upper body 14 relative to the lower body 12.

The lift device 80 includes a gear train 97 housed in a laterally slim, box-shaped gear case 82 (FIG. 5) which is fixed to the upper body 14, and an electric motor 84 housed in a substantially cylindrical motor case 102 which is connected to an upper part of the gear case 82 via a flange connection. The electric motor 84 has an output shaft 86 projecting forward from the motor case 102. The gear case 82 internally defines a gear chamber 83 (see FIG. 3), and the motor case 102 internally defines an internal chamber 103.

The gear train 97 has an input shaft 88A which projects rearward in a coaxial relationship to the output shaft 86 of the electric motor 84. The front end of the motor output shaft 86 is provided with a key 86A projecting forward from the front end of the output shaft 86, and having a rectangular parallelepiped shape. The rear end of the input shaft 88A is provided with an engagement slot 88B which is configured to complementarily receive the key 86A of the motor output shaft 86. Owing to this engagement, the motor output shaft 86 and the input shaft 88A of the gear train 97 are connected to each other in a torque transmitting relationship so that the rotation of the motor output shaft 86 is transmitted to the gear train 97.

The input shaft 88A of the gear train 97 is fitted with a worm 88 which meshes with a spur gear 94 supported by an intermediate shaft 90 in the gear chamber 83. The spur gear 94 is coaxially fitted with a pinion (not shown in the drawings) which meshes with a sector gear 96 supported by a gear output shaft 92 in the gear chamber 83. The motor output shaft 86 and the input shaft 88A extend in the fore and aft direction with a slight downward inclination, and the intermediate shaft 90 and the output shaft 92 of the gear case 82 extend laterally. Thus, the rotation of the motor output shaft 86 of the electric motor 84 is decelerated, and transmitted to the gear output shaft 92 extending laterally from the gear case 82 via the gear train 97 formed by the worm 88, the spur gear 94, and the sector gear 96.

The output shaft 92 of the gear case 82 projects laterally out of the gear case 82, and is fixedly connected to an end of a link arm 98. The other end of the link arm 98 is pivotally connected to an end of a link bar 100, via a pivot pin 101, and the other end of the link bar 100 is pivotally connected to a bracket 104 (which is fixedly attached to the lower body 12) via a pivot pin 105.

Thus, the output shaft 92 of the gear case 82 mounted on the upper body 14 is connected to the lower body 12 via a link mechanism consisting of the link arm 98 and the link bar 100.

As the output shaft 92 is rotationally actuated by the electric motor 84, the bending angle between the link arm 98 and the link bar 100 changes with the result that the tilting angle of the upper body 14 relative to the lower body 12 about the front shaft 24 changes in a corresponding manner. This in turn causes the elevation of the auger 56 relative to the road surface to be changed. As shown in FIG. 2, the output shaft 86 of the electric motor 84 tilts slightly downward relative to the horizontal direction when the upper body 14 is lowered. When the upper body 14 is raised, the output shaft 86 of the electric motor 84 tilts upward relative to the horizontal direction. However, in the following disclosure, the output shaft 86 of the electric motor 84 will be described as extending substantially horizontally.

The motor case 102 is provided with a breather device for permitting air to get into and out of the motor case 102 while protecting the motor case 102 from the intrusion of moisture or other foreign manners. The breather device will be described in the following with reference to FIGS. 3 to 8.

The motor case 102 includes a cylindrical main part 102A and a radial flange 102B formed at the front end of the main part 102A. The main part 102A defines the internal chamber 103 (see FIG. 3) that houses the stator, rotor and the like which are not shown in the drawings. Three bolt holes 102C (see FIGS. 6 and 8) are formed in the radial flange 102B. The gear case 82 includes a box-shaped main part 82A that houses the gear train 97, an end wall 82B provided at an upper rear part of the main part 82A, a cylindrical part 82C extending rearward from the peripheral part of the end wall 82B, and a radial flange 82D formed at the rear end of the cylindrical part 82C. Three threaded holes 82E (see FIGS. 4 and 5) are formed in the radial flange 82D.

Figure 6:
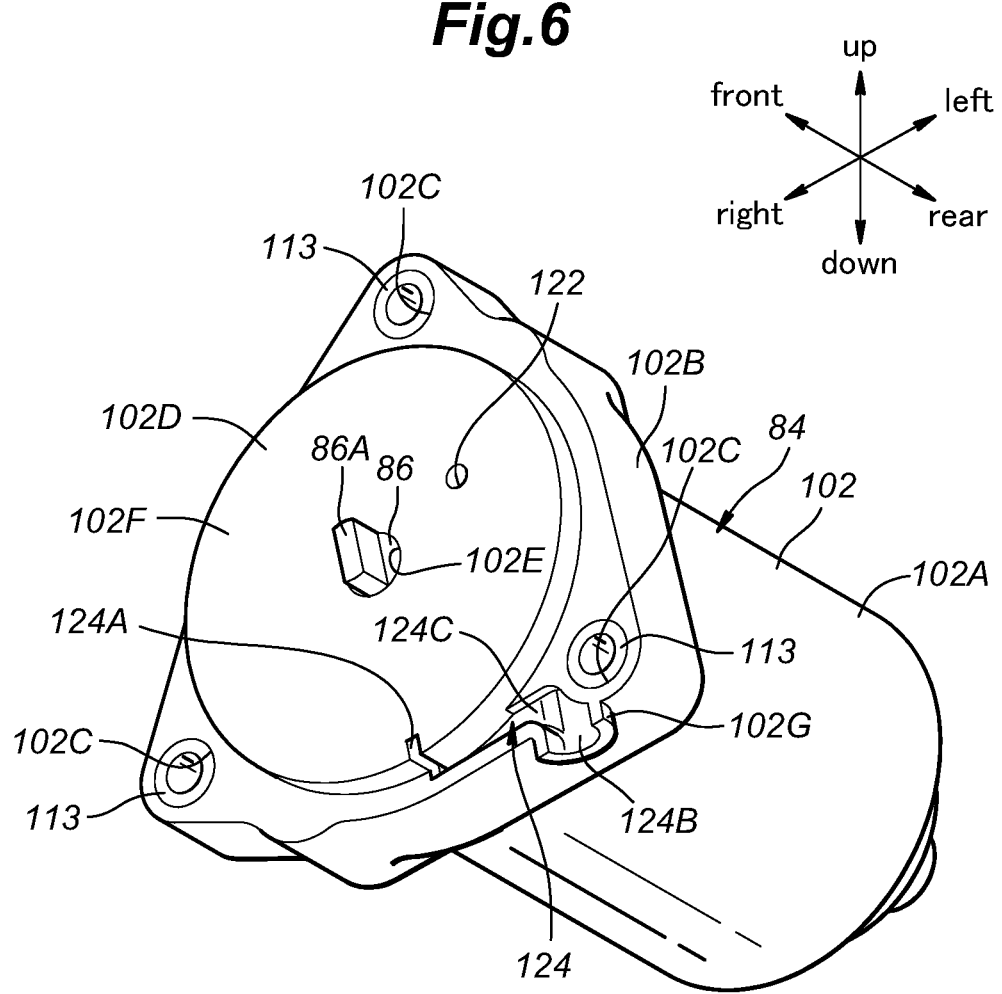
FIG. 6 is a perspective view of the motor case.
Figure 7:
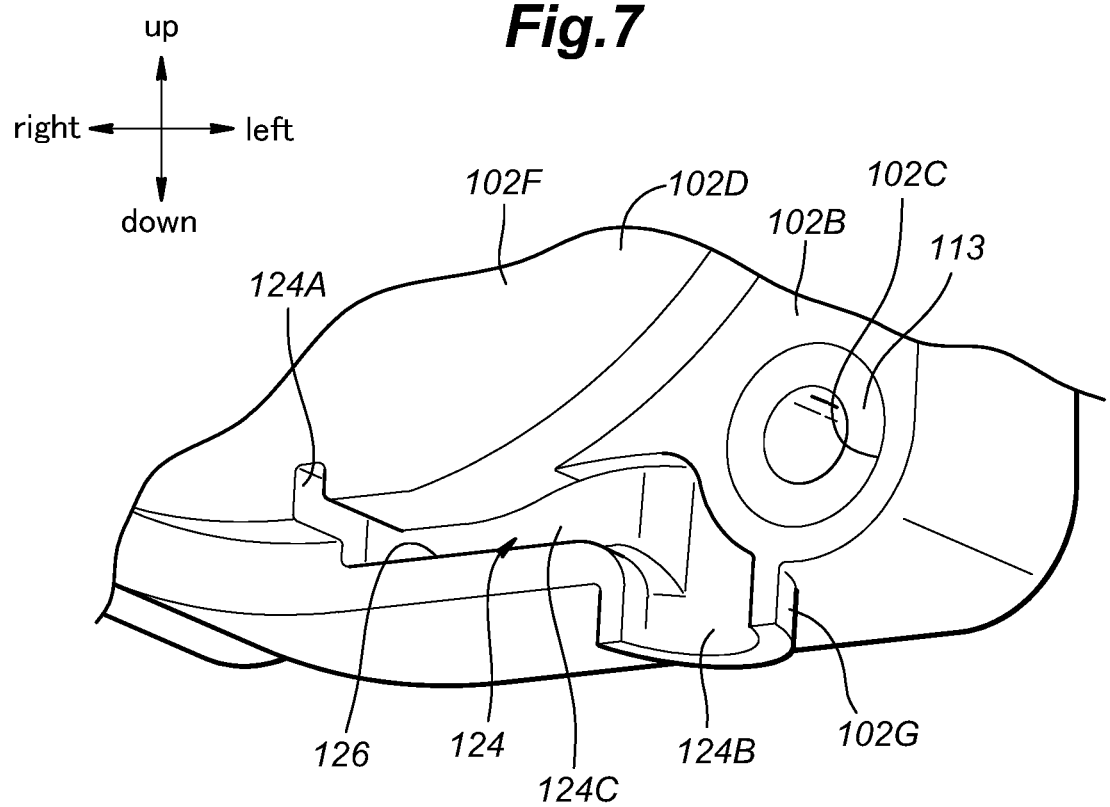
FIG. 7 is an enlarged perspective view of an external communication passage formed in the motor case.
Figure 8:
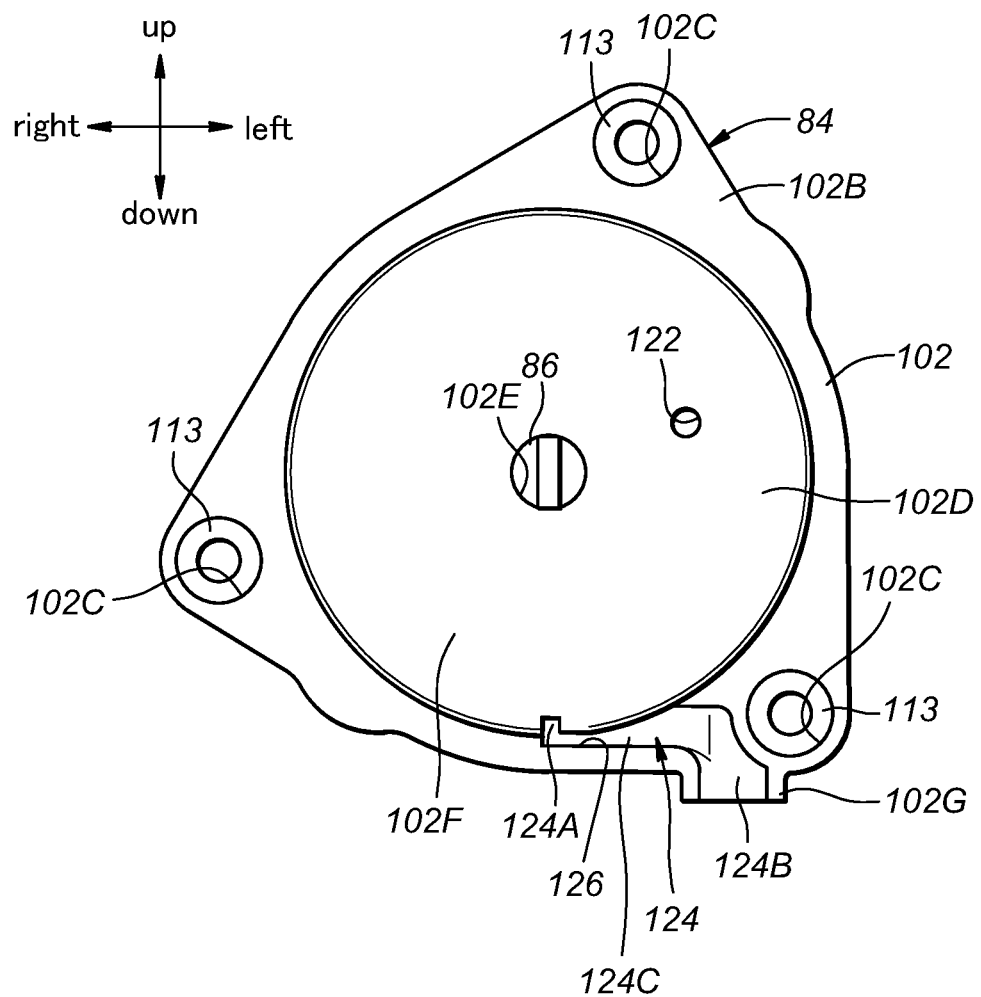
FIG. 8 is a front view of the motor case.

As shown in FIGS. 6 to 8, a metal collar member 113 is fitted in each bolt through hole 102C, and a bolt 107 (see FIG. 4) is passed into the collar member 113 from the side of the electric motor 84. Each bolt 107 is threaded into the corresponding threaded hole 82E in the radial flange 82D so that the motor case 102 is connected to the rear end of the gear case 82.

Figure 3:
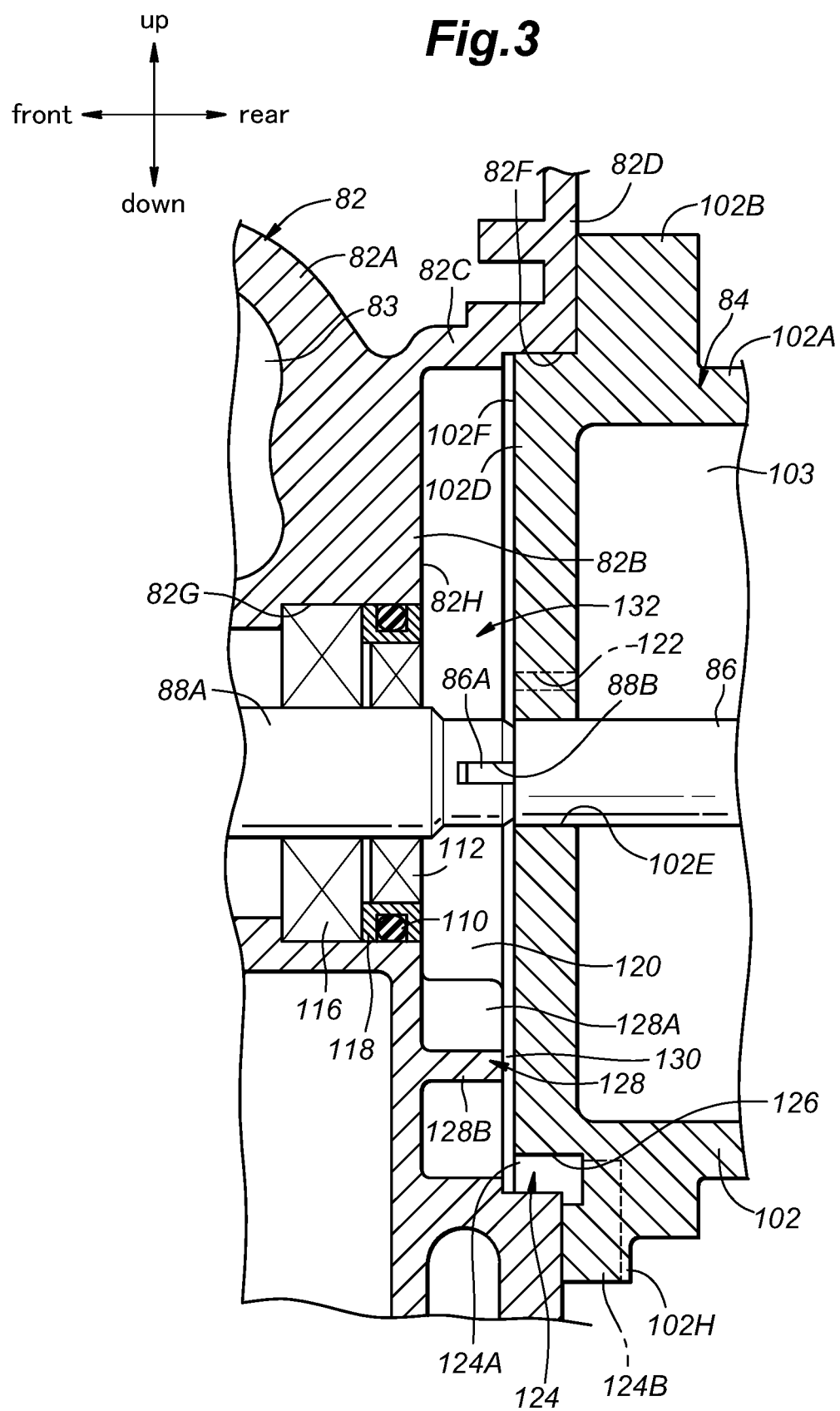
FIG. 3 is a fragmentary section view of the breather device provided between the motor case of the motor and the gear case of a gear train.

The motor case 102 is provided with a circular end wall 102D at the front end thereof. The end wall 102D is centrally provided with a through hole 102E through which the output shaft 86 of the electric motor 84 passes. As shown in FIG. 3, the end wall 102D is axially offset forward from the radial flange 102B so that a cylindrical peripheral surface of the end wall 102D projects forward (or toward the gear case 82) from the front surface of the radial flange 102B. As shown in FIG. 3, the rear end of the gear case 82 is provided with a cylindrical recess 120 which defines a planar bottom surface, and a peripheral inner surface. The rear part of the peripheral inner surface of the cylindrical recess 120 consists of a cylindrical surface 82F concentric to the output shaft 86 of the electric motor 84. The cylindrical surface 82F is complementary to and snugly receives the outer peripheral surface of the end wall 102D of the motor case 102.

As shown in FIG. 3, the end wall 82B of the gear case 82 is centrally provided with a through hole 82G through which the gear input shaft 88A passes. The through hole 82G is fitted with a roller bearing 116, and the annular space defined between the inner peripheral surface of the through hole 82G and the outer peripheral surface of the input shaft 88A is sealed by a sealing device that includes an oil seal 112 surrounding the input shaft 88A, an oil seal retainer 118, and an O ring 110 interposed between the oil seal retainer 118 and the inner peripheral surface of the through hole 82G.

Owing to the complementary engagement between the outer peripheral surface 126 of the end wall 102D of the motor case 102 and the cylindrical surface 82F of the cylindrical part 82C of the gear case 82, the motor output shaft 86 and the input shaft 88A of the gear train 97 can be easily and reliably aligned to each other.

The front part of the cylindrical recess 120 defines a cylindrical surface having a smaller diameter than the cylindrical surface 82F of the rear part of the cylindrical recess 120 so that an annular shoulder surface facing the axial direction (rearward) is defined in an axially middle part of the cylindrical recess 120. Thus, when the motor case 102 is joined to the gear case 82, the front end of the end wall 102D of the motor case 102 abuts against this shoulder surface with the result that a gap is created between the bottom surface of the cylindrical recess 120 and the front surface of the end wall 102D of the motor case 102. Thus, a substantially enclosed cylindrical chamber which will be referred to as a breather chamber 132 is defined between the bottom surface of the recess 120 and the front surface of the end wall 102D of the motor case 102.

The end wall 102D of the motor case 102 is provided with a motor communication hole (air breathing hole) 122 that communicates the breather chamber 132 with the internal chamber 103 of the motor case 102. The motor communication hole 122 is provided obliquely above (or laterally spaced from) the motor shaft through hole 102E through which the output shaft 86 passes.

An external communication passage 124 is formed in a part of the motor case 102 that extends from the end wall 102D and the adjoining part of the radial flange 102B in such a manner that the breather chamber 132 is communicated with the atmosphere via this external communication passage 124. As shown in FIGS. 6 to 8, the external communication passage 124 includes an inner section 124A that is formed by a cutout in a peripheral part of the end wall 102D of the motor case 102 on the side of the recess 120, and an intermediate section 124C than extends laterally or tangentially in the radial flange 142B, and an outer section 124B extending radially or tangentially (vertically) in the radial flange 142B on the side of the exterior, and is thus bent substantially at right angle twice three-dimensionally (bent substantially right angle in both front and side views).

In particular, the inner section 124A is defined by a bottom end of the end wall 102D of the motor case 102 in cooperation with the cylindrical part 82C of the gear case 82, and the intermediate section 124C and the outer section 124B are defined by a recess formed in the radial flange 102B of the motor case 102. The lower part of the radial flange 102B is provided with a tubular extension 102G that extends downward therefrom and internally defines an outer end part of the outer section 124B of the external communication passage 124.

The external communication passage 124 has a larger passage cross-sectional area at the outer section 124B than at the inner section 124A. The intermediate section 124C progressively widens from the inner section 124A to the outer section 124B, or has a cross-sectional area that progressively increases from the inner section 124A to the outer section 124B.

The inner section 124A of the external communication passage 124 is positioned lower than the motor communication hole 122 (preferably in a lowest part of the breather chamber 132), and directly under the output shaft 86, or in other words, the motor shaft through hole 102E. Thus, the external communication passage 124 communicates the lower end part of the breather chamber 132 to the outside.

Figure 4:
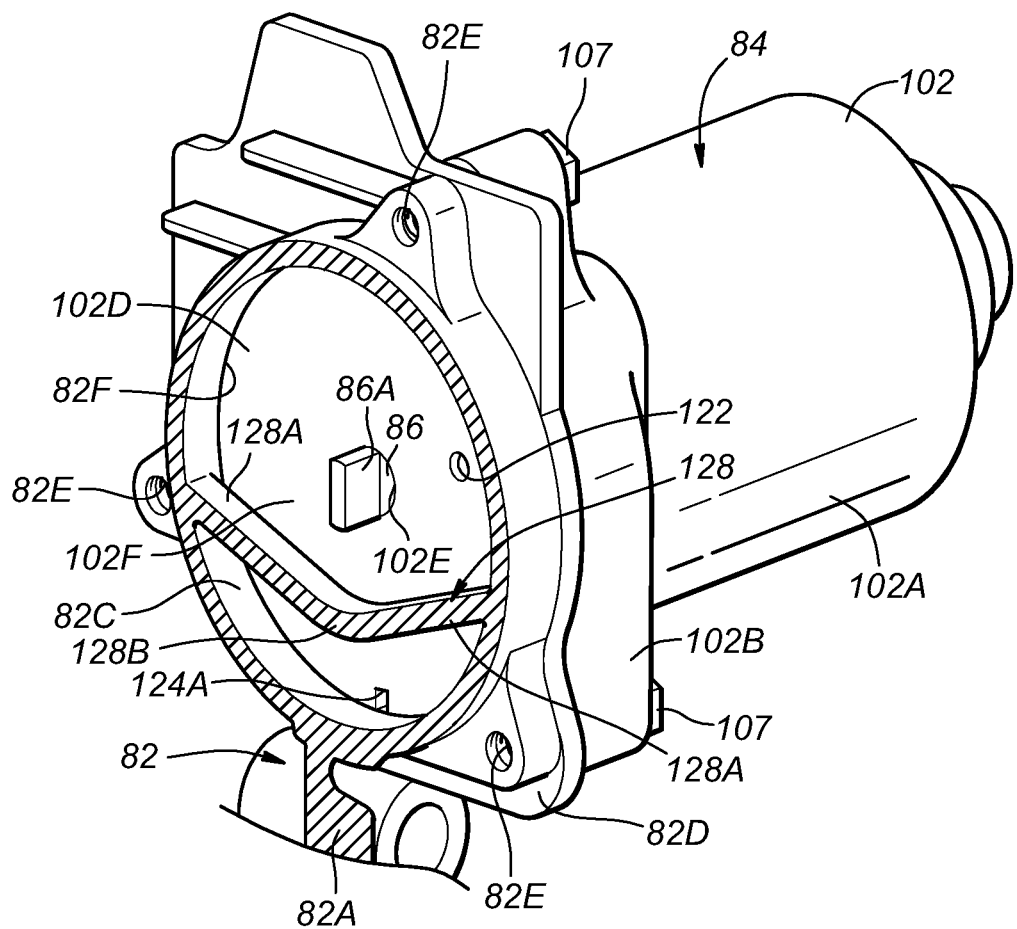
FIG. 4 is a cross sectional perspective view of the breather device cut through a part of the gear case.
Figure 5:
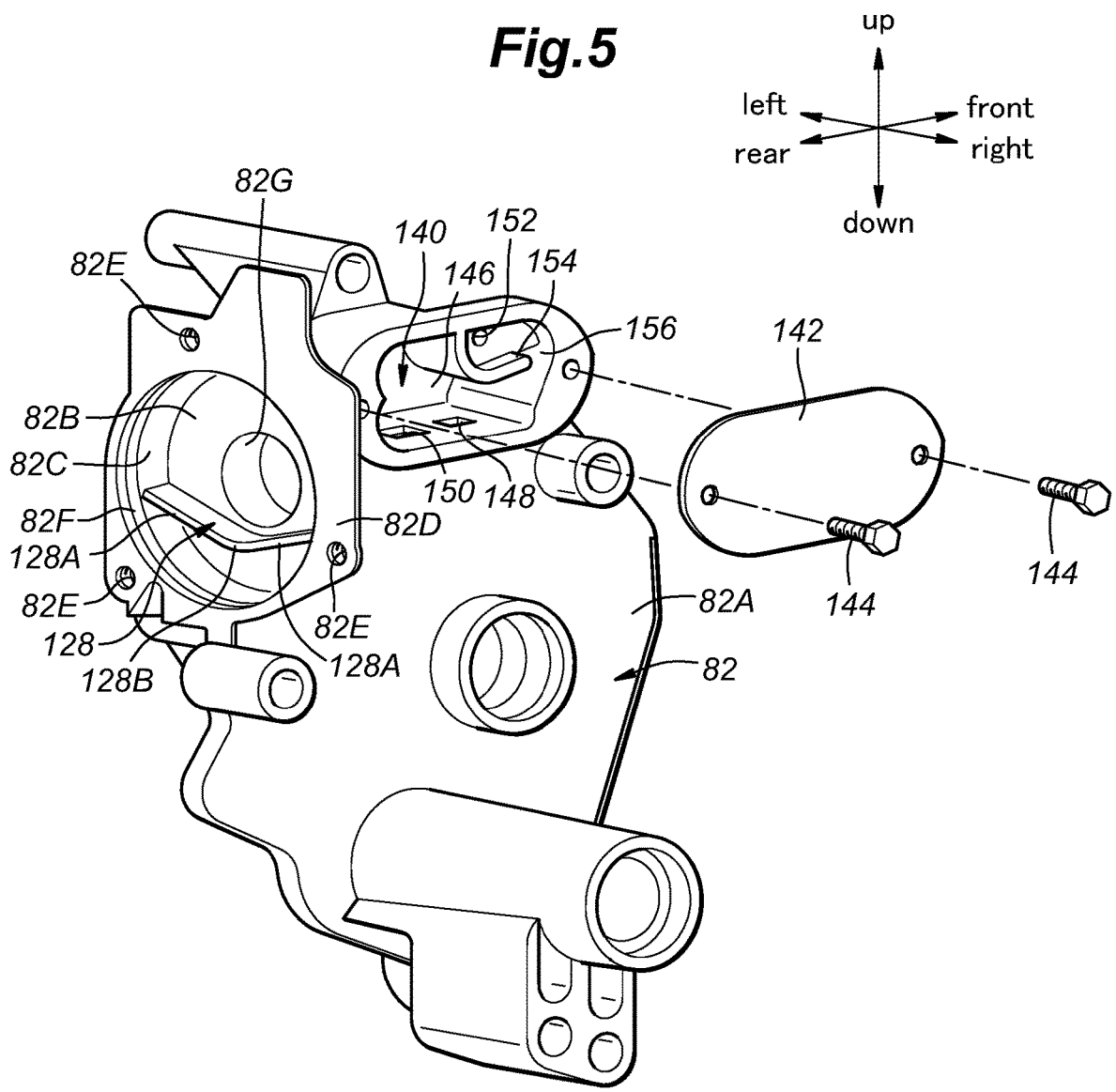
FIG. 5 is an exploded perspective view of the gear case.

As shown in FIGS. 3 to 5, the end wall 82B of the gear case 82 is provided with a partition wall 128 projecting from the end wall 82B of the gear case 82 toward the end wall 102D of the motor case 102, and extending substantially laterally across the end wall 82B. A small gap 130 (FIG. 3) is defined between the free end of the partition wall 128 and the end wall 102D of the motor case 102. The partition wall 128 is slightly bent or dips downward in a laterally middle part 128B thereof so as to present a substantially V-shape as viewed in the axial direction.

The motor case breather device of this embodiment is thus formed by the breather chamber 132, the motor communication hole 122, the external communication passage 124 and the partition wall 128, as best shown in FIGS. 3 and 4.

As shown in FIG. 5, the gear case 82 is provided with a gear case breather device 140 that includes a breather chamber 146 defined as a recess formed in an extension of the main part 82A of the gear case 82. The recess has an open end facing the right side thereof which is closed by a cover plate 142 attached thereto by a pair of bolts 144.

The extension of the main part 82A defining the breather chamber 146 is provided with a breathing hole 152 that communicates an upper part of the breather chamber 146 with the outside, and a front communication hole 148 and a rear communication hole 150 communicating a lower part or a bottom part of the breather chamber 146 with the gear chamber 83. A partition wall 154 extends inside the breather chamber 146 so as to communicate the breathing hole 152 with the front communication hole 148 and the rear communication hole 150 via a circuitous passage instead of directly communicating the breathing hole 152 with the front communication hole 148 and the rear communication hole 150. In the illustrated embodiment, the partition wall 154 is L-shaped as viewed in the laterally direction by including a vertical section extending downward from the upper end of the breather chamber 146 and a lateral section extending laterally toward the front wall of the breather chamber 146 (or to a point at a small distance to an opposing side wall of the breather chamber 146.

The mode of operation of the snow blower 10 of the illustrated embodiment will be described in the following with reference to FIG. 1. When the operator operates the travel lever 42 of the input unit 40, the travel drive unit 34 is activated, and the driven wheels 28 are rotationally driven via the front shaft 24. As a result, the crawler 32 rotates and the snow blower 10 travels forward.

When the operator operates the snow removal switch 44 of the input unit 40, the blower 60 and the auger 56 are operated by the internal combustion engine 68 via the output shaft 70. More specifically, the torque output of the internal combustion engine 68 is transmitted from the output shaft 70 to the drive shaft 64 via the deadman's clutch 72, the drive pulley 74, the endless belt 76 and the driven pulley 66 with the result that the blower 60 and the auger 56 rotate. The auger 56 crushes the snow in front of the snow blower 10 and collects the crushed snow in the laterally central part of the auger housing 50. The collected snow is introduced into the blower case 58 and thrown from the chute 62 in the desired direction by the rotation of the blower 60.

When the operator operates the height adjustment switch 46, the electric motor 84 is rotationally driven, and the rotation of output shaft 86 thereof is transmitted to the gear output shaft 92 via the gear train 97 in the gear case 82. As a result, the upper body 14 pivots around the front shaft 24 in a substantially vertical direction with respect to the lower body 12 with the result that the ground height of the auger 56 is adjusted.

When the internal pressure of the internal chamber 103 of the motor case 102 rises due to the heat generated by the operation of the electric motor 84, the air in the internal chamber 103 flows into the breather chamber 132 via the motor communication hole 122. The air then flows through the gap 130 defined between the partition wall 128 and the opposing end wall 102D of motor case 102, and expelled to the outside via the external communication passage 124. When the internal pressure of the internal chamber 103 of the motor case 102 drops, the air flows back into the interior of the motor case 102 via the same passage in reverse order. As a result, the pressure of the internal chamber 103 is maintained at the atmospheric pressure at all times.

When water splashes upward during the operation of the snow blower 10, the water may enter the breather chamber 132 via the external communication passage 124.

In this embodiment, as shown in FIGS. 6 to 8, the external communication passage 124 includes the inner section 124A, the intermediate section 124C, and the outer section 124B, and is bent three-dimensionally from one end to the other. Owing to the circuitous bends in the external communication passage 124, water is less likely to enter the breather chamber 132 via the external communication passage 124. In addition, since the outer section 124B of the external communication passage 124 has a passage cross-sectional area larger than that of the inner section 124A, the water that has entered the external communication passage 124 from the outer section 124B thereof tends to be readily removed from the external communication passage 124.

Even if water should enter the breather chamber 132, the water is effectively prevented from reaching the motor shaft through hole 102E or the motor communication hole 122 owing to the presence of the partition wall 128. Thus, the internal chamber 103 of the electric motor 84 is effectively protected from the intrusion of water.

Even if water should enter the breather chamber 132 and reach the part thereof above the partition wall 128 via the gap 130, since the partition wall 128 is bent downward in the laterally middle part 128B thereof, the water is collected in the laterally middle part 128B of the partition wall 128, and drops downward via the gap 130 directly onto the inner end of the inner section 124A of the external communication passage 124. As a result, the water that has entered the breather chamber 132 can be smoothly discharged to the outside via the external communication passage 124.

Although the present invention has been described in terms of a preferred embodiment thereof, it should be readily apparent to those skilled in the art that the present invention is not limited to such an embodiment, and can be modified in various ways without departing from the scope of the present invention.

For example, the external communication passage 124 may be formed as a through hole or the like in either the gear case 82 or the motor case 102. The partition wall 128 may also project from the end wall 102D of the motor case 102 toward the end wall 82B of the gear case 82.

The motor case breather device of the present embodiment is not limited to the use in a snow blower 10, but can be applied to various other work machines having an electric motor 84 connected to a gear case 82.

In addition, not all of the components shown in the above embodiment are essential for the present invention, and can be omitted or substituted as appropriate without departing from the gist of the present invention.

The invention claimed is:

1. A breather device for a motor case of an electric motor, the motor case being connected to a gear case that receives a gear train therein, wherein the motor case and the gear case are respectively provided with a first end wall and a second end wall, that oppose each other, and an output shaft of the electric motor and an input shaft of the gear train are passed through the first end wall and the second end wall, respectively, and are connected to each other in a torque transmitting relationship, the breather device comprising:
a breather chamber defined between the first end wall and the second end wall in a substantially enclosed manner;
a motor communication hole provided in the first end wall so as to communicate an interior of the motor case with the breather chamber;
an external communication passage formed in a wall of the motor case or the gear case at a position lower than the motor communication hole so as to communicate the breather chamber to outside; and
a partition wall extending laterally across the breather chamber and projecting from one of the first end wall and the second wall toward the opposing end wall so as to define a small gap between the partition wall and the opposing end wall, the partition wall being positioned between the motor communication hole and the external communication passage.

2. The breather device according to claim 1, wherein the partition wall is provided below the output shaft of the electric motor.

3. The breather device according to claim 2, wherein the partition wall slopes downward from both side parts thereof toward a central part thereof.

4. The breather device according to claim 3, wherein the external communication passage has an inner end which is vertically aligned with the central part of the partition wall.

5. The breather device according to claim 1, wherein the external communication passage has an inner end at a lowest point in the breather chamber.

6. The breather device according to claim 1, wherein the external communication passage includes an inner section that extends from the breather chamber into the first end wall of the motor case in an axial direction, an intermediate section that extends tangentially from the inner section, and an outer section that extends downwards from an end of the intermediate section remote from the inner section to an exterior of the motor case.

7. The breather device according to claim 6, wherein the external communication passage has a larger passage cross-sectional area at an inner end thereof than at an outer end thereof.

8. The breather device according to claim 1, wherein the second end wall of the gear case is axially recessed from a peripheral wall of the gear case, and the first end wall of the motor case protrudes axially from a peripheral wall of the motor case, and is complementarily fitted into a part of the peripheral wall of the gear case extending proud of the second end wall.

* * * * *